United States Patent [19]

Lewis et al.

[11] Patent Number: 5,661,827
[45] Date of Patent: Aug. 26, 1997

[54] OPTICAL SWITCH HAVING A REFLECTOR

[75] Inventors: Warren Hale Lewis, New Port; Robert Nelson Fair, Jr., York, both of Pa.

[73] Assignee: The Whitaker Corporation, Wilmington, Del.

[21] Appl. No.: 698,534

[22] Filed: Aug. 15, 1996

[51] Int. Cl.$^6$ ............................................. G02B 6/35
[52] U.S. Cl. .............................. 385/18; 385/16; 385/47
[58] Field of Search ............................ 385/18, 15–24, 385/47, 140

[56] References Cited

U.S. PATENT DOCUMENTS

| | | | |
|---|---|---|---|
| 4,479,697 | 10/1984 | Kapany et al. | 350/96.18 |
| 4,626,066 | 12/1986 | Levinson | 350/96.18 |
| 4,705,349 | 11/1987 | Reedy | 350/96.15 |
| 4,893,891 | 1/1990 | Fujita et al. | 350/96.2 |
| 4,993,796 | 2/1991 | Kapany et al. | 350/96.15 |
| 5,000,534 | 3/1991 | Watanabe et al. | 350/96.2 |
| 5,031,994 | 7/1991 | Emmons | 350/96.2 |
| 5,056,886 | 10/1991 | Hoult | 385/20 |
| 5,226,104 | 7/1993 | Unterleitner et al. | 385/140 |
| 5,361,315 | 11/1994 | Lewis et al. | 385/16 |

*Primary Examiner*—Phan T. H. Palmer

[57] ABSTRACT

An optical switch (1) has a refractive element (3) between a reflector (5) and multiple optical waveguides (6), the refractive element (3) being pivotable to different positions to optically couple different sets of the waveguides (6), the reflector (5) being received on a reflector holder (7), the reflector holder (7) engaging spaced apart springs (9), and the springs (9) being compressed to aim the focal point of the reflector (5) at a precise position in front of the waveguides (6).

8 Claims, 5 Drawing Sheets

OPTICAL SWITCH HAVING A REFLECTOR

FIELD OF THE INVENTION

The invention relates to an optical switch wherein optical waveguides are positioned at a focus of a reflector, and a refractive element pivots in the switch for optically coupling different sets of the optical waveguides.

BACKGROUND OF THE INVENTION

U.S. Pat. No. 5,361,315 discloses an optical switch comprising: a refractive element between a reflector and multiple optical waveguides, the refractive element being pivotable to a first position to optically couple a first set of the waveguides, and the refractive element being pivotable to a second position to optically couple a second set of the waveguides. Each set of waveguides is optically coupled by light being transmitted from one waveguide of the set to another waveguide of the set.

The waveguides are required to be positioned at a desired focus from the reflector. A need exists for an adjustment mechanism to adjust the position of the reflector focus in front of the waveguides.

SUMMARY OF THE INVENTION

According to the invention, an optical switch comprises, a refractive element between a reflector and multiple optical waveguides, the refractive element being pivotable to different positions to optically couple different sets of the waveguides, the reflector being received on a reflector holder, the reflector holder engaging spaced apart springs, and the springs being compressed to aim the focal point of the reflector at a precise position in front of the waveguides. An advantage resides in the focus of the reflector being adjustable to a desired position in front of the waveguides.

A feature of an embodiment of the invention comprises dome shaped springs that are compressed by the reflector holder. The springs provide an advantage of being compressed by the reflector holder to aim the focus of the reflector.

Another feature of an embodiment of the invention comprises adjustment screws that engage the reflector holder and cause compression of the springs to aim the focus of the reflector.

Embodiments of the invention will now be described by way of example with reference to the drawings, according to which:

DETAILED DESCRIPTION

Figure 1:
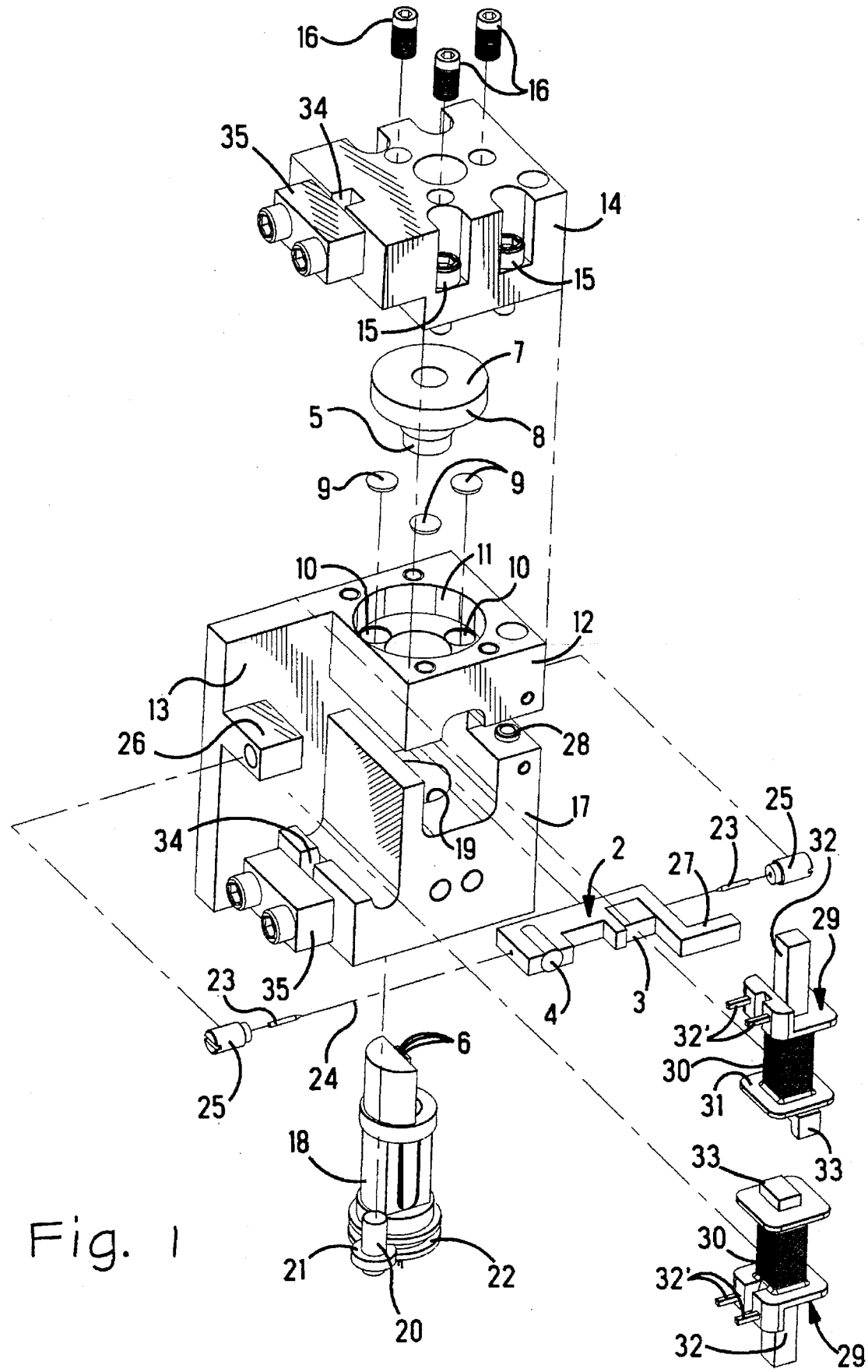
FIG. 1 is an isometric view of an optical switch, with parts separated from one another.
Figure 6:
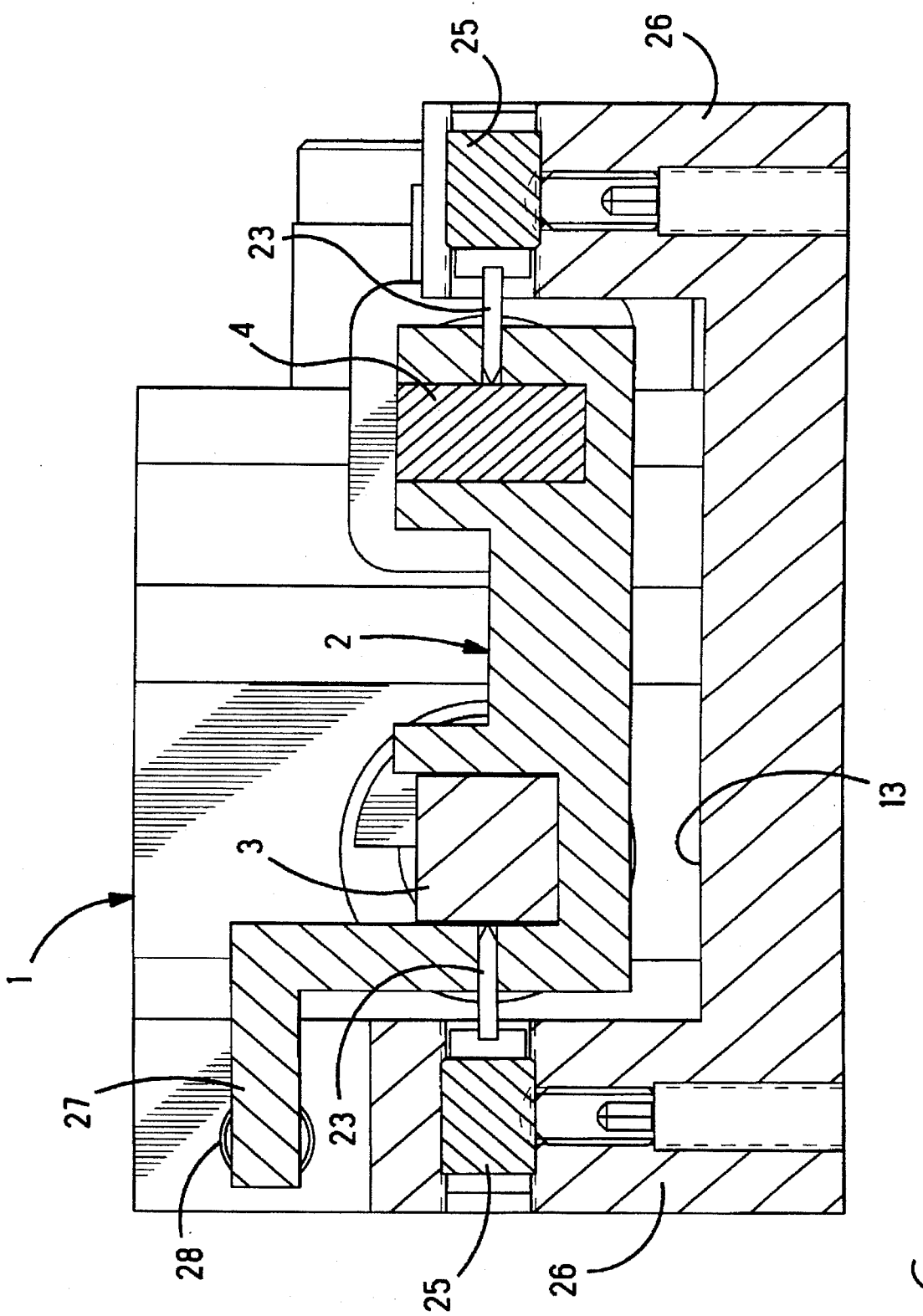
FIG. 6 is a section view taken along the line 6—6 of FIG. 3.
Figure 7:
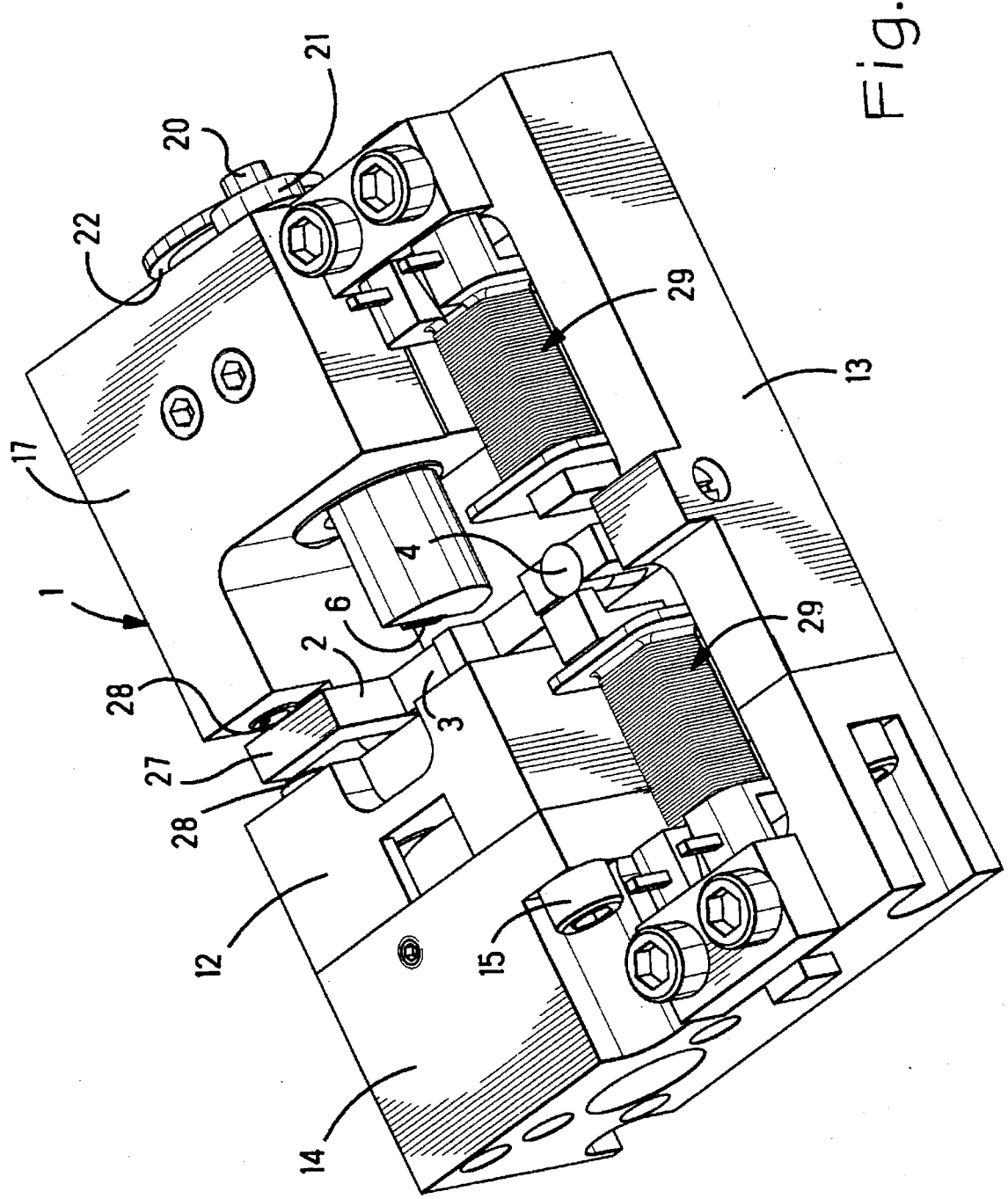
FIG. 7 is a view similar to FIG. 2 of another embodiment of an optical switch.

With reference to FIGS. 1, 6 and 7, an optical switch (1) is constructed with a pivotable holder (2) on which is mounted an optical refractive element (3) and a permanent magnet (4). The refractive element (3) is between a reflector (5) and multiple optical waveguides (6), for example, waveguides (6) in the form of optical fibers.

With reference to FIG. 1, the reflector (5) is a concave mirror held by a reflector holder (7). A radially projecting, circular flange (8) on the reflector holder (7) is supported against three, spaced apart, dome shaped springs (9). The springs (9) are supported in recesses (10) in a reflector receiving cavity (11) in a reflector support block (12). The reflector support block (12) is fixed to a frame (13). A reflector adjustment block (14) covers the reflector holder (7) and is attached with fasteners (15) to the reflector support block (12). Three adjustment screws (16) in the adjustment block (14) engage the flange (8) on the reflector holder (7). Also fixed to the frame (13) is a waveguide support block (17), FIG. 1. The optical waveguides (6) are held in a cylindrical waveguide holder (18), in turn, adjustably received along a waveguide receiving cavity (19) in the waveguide support block (17). A waveguide focus adjustment fastener (20) with a radially projecting flange (21) threadably attaches to the support block (17). The flange (21) registers in a peripheral groove (22) in the waveguide holder (18). The position of the fastener (20) in the support block (17) is threadably adjusted to alter the distance of the waveguides (6) along the cavity (19) to a precise focus relative to the reflector (5).

A preliminary alignment of the reflector (5) is accomplished by translating the mirror holder (7) transversely with respect to the waveguides (6) while translating the waveguides (6) longitudinally using the focus adjustment fastener (20). When this rough adjustment is complete, the reflector holder (7) is brought into contact with the dome springs (9) by tightening the adjustment screws (16). By adjusting the position of each of the screws (16), the flange (8) on the reflector holder (7) will resiliently compress each of the dome shaped springs (9) to aim the focal point of the concave mirror (5) at a precise position in front of the waveguides (6).

With reference to FIGS. 1, 6 and 7, the holder (2) is pivotally supported by pivot pins (23), FIGS. 1 and 6. The pivot pins (23) are axially aligned with each other, and define a pivot axis (24) of the holder (2). The pivot axis (24) projects through the refractive element (3) and the magnet (4). The pivot pins (23) are rotatably supported in respective jeweled bearings (25). Bearing blocks (26) on the frame (13) support the jeweled bearings (25). An offset arm (27) on the holder (2) extends outwardly and offset from the pivot axis (24).

The holder (2) is inertially balanced about the pivot axis (24), to be free from angular acceleration about the pivot axis (24) in response to linear acceleration and vibration experienced by the optical switch (1). Thereby, the inertially balanced holder (2) decouples the refractive element (B) from angular acceleration in response to linear acceleration and vibration.

Figure 2:
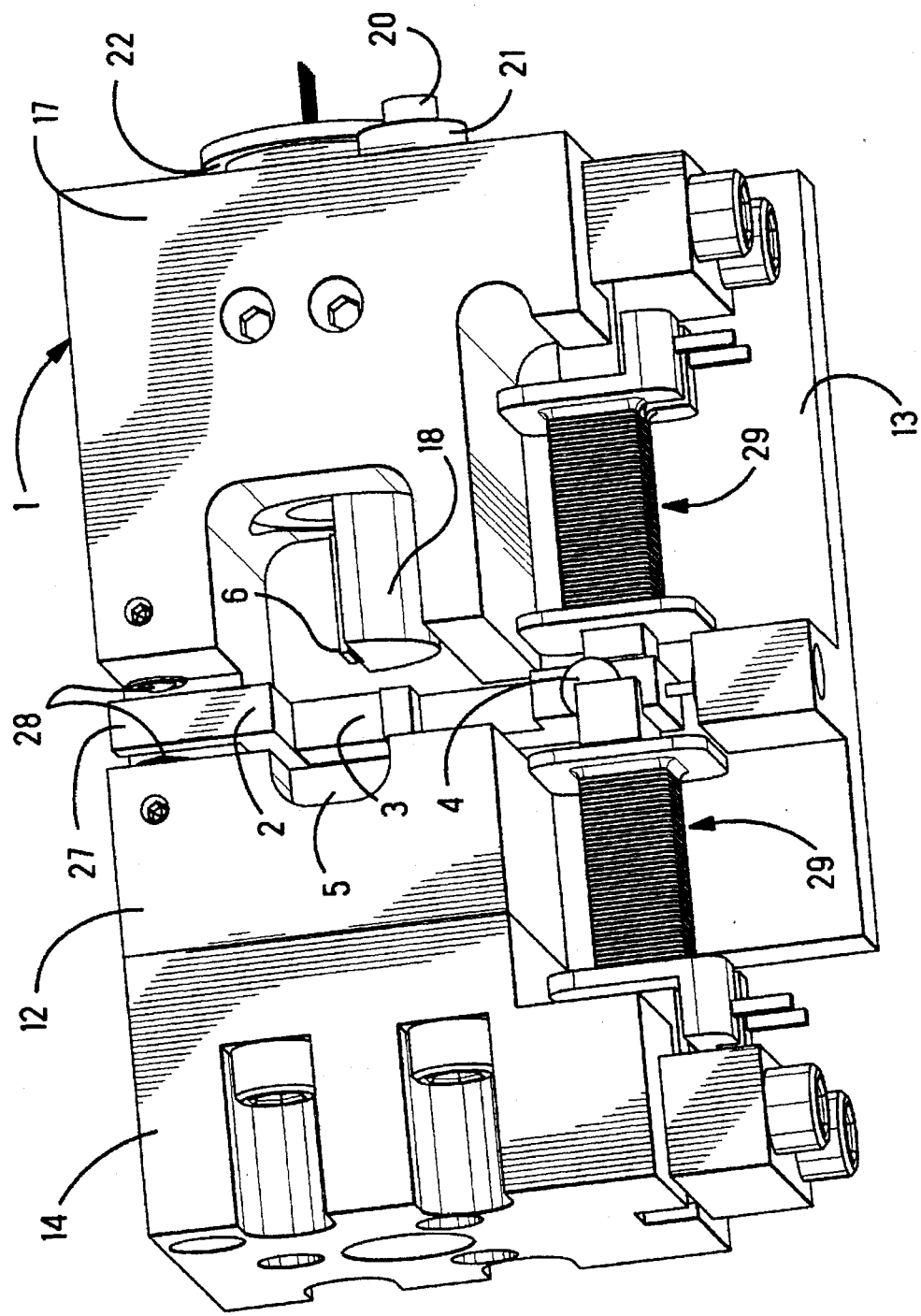
FIG. 2 is an isometric view of the optical switch as shown in FIG. 1 with parts assembled.
Figure 3:
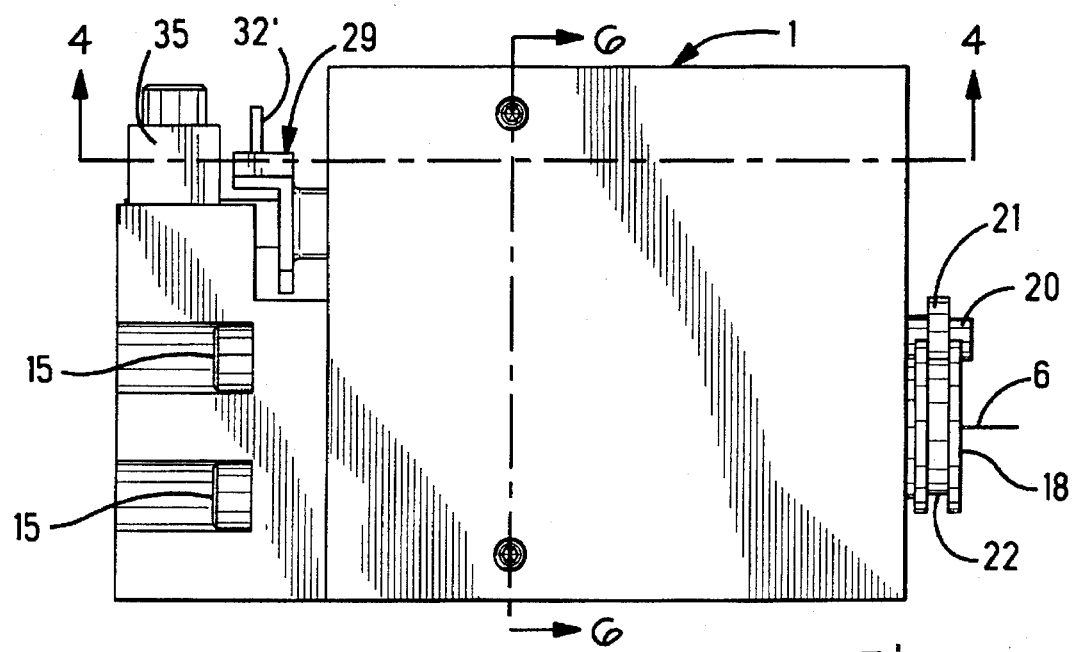
FIG. 3 is a side view of the optical switch as shown in FIG. 2.
Figure 4:
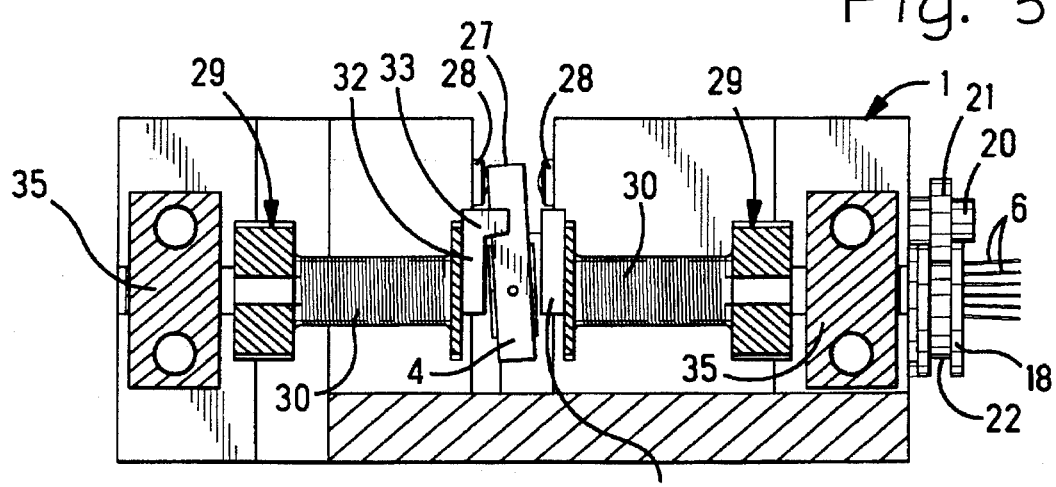
FIG. 4 is a section view taken along the line 4—4 of FIG. 3.
Figure 5:
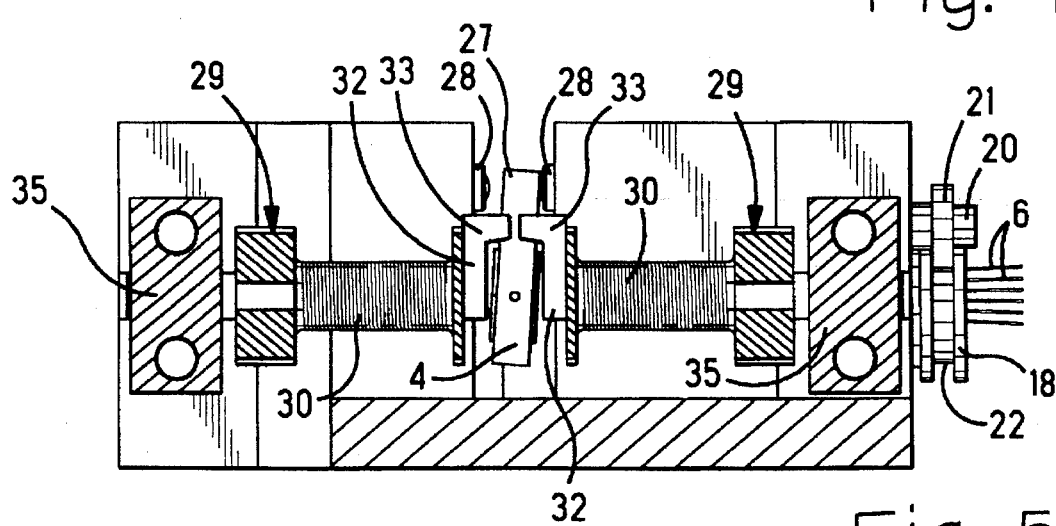
FIG. 5 is a view similar to FIG. 4 of another embodiment of an optical switch.

The offset arm (27) is pivotable between two stops (28), FIGS. 2, 4 and 5, mounted on respective support blocks (12, 17). The position of each of the stops (28) is threadably adjustable. For example, the stops (28) are adjustable stop screws with jeweled surfaces against which the offset arm (27) impinges. The holder (2) is pivoted to a first position, FIG. 4, against one of the stops (27). The holder (2) is pivoted to a second position, FIG. 5, against another of the stops (27).

The refractive element (3) is pivotable, together with the holder (2), to a first position to optically couple a first set of the waveguides (6). The refractive element (3) is pivotable, together with the holder (2), to a second position to optically couple a second set of the waveguides (6). Each set of waveguides (6) is optically coupled by light being transmitted from one waveguide (6) of the set to another waveguide (6) of the set. Operation of the optical switch (1) is described in greater detail in U.S. Pat. No. 5,361,315, to Warren H. Lewis and Gregory B. Powers, granted Nov. 1, 1994, the disclosure of which is incorporated herein by reference. According to the Patent, a first set of optical waveguides comprises first and second optical fibers, and a second set of optical waveguides comprises the first optical fiber and a third optical fiber.

With reference to FIGS. 1, 2, 4, 5 and 6, at least one magnetic coil (29) is utilized to override the force of attraction of the magnet (4), and to pivot the refractive element (3) about the pivot axis (24) of the holder (2), which causes the holder (2) to pivot to the first and second positions. Two coils (29) can be electrically connected, and are spaced apart across a gap within which the magnet (4) moves, as the refractive element (3) pivots between the first and second positions. The two coils (29) provide a more uniform distribution of magnetic flux in a gap within which the magnet (4) moves, as the refractive element (3) pivots from one position to another.

Each of the coils (29) comprises, magnet wire windings (30) on a hollow insulating bobbin (31), the windings (30) being connected in a known manner to a pair of electrical terminals (32) on the bobbin (31). A ferrous element (32) is encircled by the bobbin (31) and the windings (30). In each embodiment shown in FIGS. 4 and 5, a projection (33) on and of a first ferrous element (32) is in the form of a unitary, projecting offset end on a corresponding ferrous element (32). In the embodiment shown in FIG. 5, a similar projection (33) is on a second ferrous element (32), as well as a similar projection (33) being on a first ferrous element (32). Each projection (33) is positioned relative to the pivot axis (24) of the holder (2) to attract the permanent magnet (4). The ferrous elements (32) are mounted along slots (34) in respective blocks (14, 17), and are clamped by clamps (35).

In each of the embodiments of FIGS. 4 and 5, the magnet (4) is attracted with a force of attraction to the projection (33) of a corresponding first ferrous element (32), to impel the magnet (4), and to pivot the refractive element (3) and the holder (2) to the first position, shown in FIG. 4. The magnet (4) tends to remain stationary until at least one coil (29), becomes activated with electrical current of requisite polarity to provide a torque on the magnet (4) that overrides the force of attraction of the magnet to the first ferrous element (32), and to pivot the refractive element (3) from the first position to the second position. With reference to the embodiment of FIG. 4, the current remains on to retain the refractive element (3) in the second position. Further, with reference to the embodiment of FIG. 4, the magnet (4) tends to return to the first ferrous element (32) when current to the coil (29) is turned off.

Preferably, both coils (29) are activated with current of requisite polarity to provide a uniform distribution of magnetic flux in a gap in which the magnet (4) moves as the refractive element (3) pivots between the first and second positions.

In the embodiment of FIG. 5, the magnet (4) tends to remain stationary in the second position until at least one coil (29) becomes activated with electrical current to provide a torque on the magnet (4) that overrides the force of attraction of the magnet (4) to the corresponding second ferrous element (32), and to pivot the refractive element (3) to the first position. To retain the refractive element (3) in the first position, the current in said at least one coil (29) is turned off. Thus, to pivot the refractive element (3) to the first position, only a pulse of current of requisite polarity is needed.

The magnet tends to remain stationary with the refractive element (3) in the new, first, position until said at least one coil (29) becomes activated with electrical current of requisite polarity to provide a torque on the magnet (4) that overrides the force of attraction of the magnet (4) to the first ferrous element (32), and to pivot the refractive element (3) to the second position. Thus, to retain the refractive element (3) in the first position, the current to said at least one coil (29) is turned off. To change the position of the refractive element (3) from one position to the other, only a pulse of current through said at least one coil (29) is needed of requisite polarity.

According to the embodiment of FIG. 5, said at least one coil (29) is provided with reversible current, to provide a torque that is reversible and activated by pulsing said at least one magnetic coil (29) with the reversible current.

An advantage resides in the torque being reversible to override the force of attraction to one or the other of the ferrous elements (32) to pivot the refractive element (3) to one position or the other.

Preferably, both coils (29) are activated with current of requisite polarity to provide a uniform distribution of magnetic flux in a gap within which the magnet (4) moves as the refractive element (3) pivots between the first and second positions.

An advantage of the invention resides in a rugged optical switch for optically coupling different sets of optical waveguides, wherein an inertially balanced holder decouples the switch from angular acceleration in response to linear acceleration and vibration.

Other embodiments and modifications of the invention are intended to be covered by the spirit and scope of the appended claims.

What is claimed is:

1. An optical switch comprising: a refractive element between a reflector and multiple optical waveguides, the refractive element being pivotable to different positions to optically couple different sets of the waveguides, the reflector being received on a reflector holder, the reflector holder engaging spaced apart springs, the springs being separate from the refractive element, and the springs being compressed by adjusting the position of the reflector holder to aim the focal point of the reflector at a precise position in front of the waveguides.

2. An optical switch as recited in claim 1 wherein, the reflector is received by a reflector support block, and the springs are dome shaped springs supported in the reflector support block.

3. An optical switch as recited in claim 2 wherein, adjustment screws are in an adjustment block attached to the reflector support block, and the adjustment screws engage the reflector holder to compress each of the springs.

4. An optical switch as recited in claim 1 wherein, the springs are dome shaped springs.

5. An optical switch as recited in claim 1 wherein, the waveguides are held in a waveguide holder on a support block, and a waveguide focus adjustment fastener registers with the waveguide holder and threadably adjusts in the support block to alter the distance of the waveguides to a precise focus relative to the reflector.

6. In an optical switch comprising: a refractive element between a reflector and multiple optical waveguides, the refractive element being pivotable to different positions to optically couple different sets of the waveguides, the improvement comprising: the reflector being received on a reflector holder, the reflector holder engaging spaced apart springs, the springs being separate from the refractive element, and the springs being compressed by adjusting the position of the reflector holder to aim the focal point of the reflector at a precise position in front of the waveguides.

7. An optical switch as recited in claim 6 wherein, the springs are dome shaped springs.

8. An optical switch as recited in claim 7 wherein, the springs are supported in recesses in a reflector support block to which the reflector holder is mounted.

* * * * *